United States Patent
Mueller

(10) Patent No.: US 6,308,440 B1
(45) Date of Patent: Oct. 30, 2001

(54) EXCAVATION ATTACHMENT FOR POWERED LOADER

(76) Inventor: Marvin A. Mueller, 1010 County Rd. 140, Georgetown, TX (US) 78626-1913

( * ) Notice: Subject to any disclaimer, the term of this patent is extended or adjusted under 35 U.S.C. 154(b) by 0 days.

(21) Appl. No.: 09/866,844

(22) Filed: May 30, 2001

(51) Int. Cl.$^7$ ........................................................ E02F 3/96
(52) U.S. Cl. .................................................. 37/404; 37/302
(58) Field of Search ............................... 37/403, 404, 405, 37/406, 408, 409, 410, 903, 301, 302, 303; 414/912, 724, 723

(56) References Cited

U.S. PATENT DOCUMENTS

| | | | |
|---|---|---|---|
| 2,310,526 | * | 2/1943 | Horrigan . |
| 2,608,772 | | 9/1952 | Laird . |
| 2,817,168 | * | 12/1957 | Mullin . |
| 2,837,844 | | 6/1958 | Launder . |
| 2,877,572 | * | 3/1959 | Dyess . |
| 2,886,286 | * | 5/1959 | Walls . |
| 3,596,996 | | 8/1971 | Carter . |
| 3,778,111 | | 12/1973 | Ciofani . |
| 3,959,900 | | 6/1976 | Luck . |
| 3,975,844 | | 8/1976 | Olson . |
| 3,999,315 | | 12/1976 | Nye . |
| 4,151,664 | | 5/1979 | Maura . |
| 4,313,504 | * | 2/1982 | Fischer . |
| 4,327,509 | | 5/1982 | Bean . |
| 4,333,250 | | 6/1982 | Henderson . |
| 4,521,980 | * | 6/1985 | Solaja . |
| 4,618,005 | | 10/1986 | Tower . |
| 4,749,048 | | 6/1988 | Kelly . |
| 4,845,867 | | 7/1989 | Albrecht . |
| 5,333,693 | * | 8/1994 | Severeid . |
| 5,901,477 | * | 5/1999 | Weaver . |
| 6,023,863 | | 2/2000 | Mahin . |
| 6,088,938 | * | 7/2000 | Logan . |

FOREIGN PATENT DOCUMENTS

| | | | |
|---|---|---|---|
| 2083110 | | 3/1982 | (GB) . |
| 560561 | * | 6/1977 | (SU) ...................................... 37/302 |
| 808052 | * | 2/1981 | (SU) ...................................... 37/302 |
| 1818011 | * | 5/1993 | (SU) ...................................... 37/302 |

* cited by examiner

Primary Examiner—Victor Batson
(74) Attorney, Agent, or Firm—Richard C. Litman

(57) ABSTRACT

An excavation attachment for a powered loader, e. g., skid steer loader, front end loader, etc., provides considerably greater leverage for removal of stumps, large imbedded concrete blocks and stones, etc., from the underlying surface. The attachment includes a transverse cylinder or drum with one or more tines extending generally radially therefrom. The attachment is secured to a conventional front end loader, skid steer loader, etc., and the tines inserted beneath the object to be moved. The drum is lowered, and the attachment is rotated using conventional load bucket tilt hydraulics. The drum serves as a fulcrum immediately adjacent the prying tines, thereby providing a considerable increase in available force and precluding lifting of the opposite end of the machine if the load is too great. A second embodiment includes one or more hydraulically actuated tines opposed to the fixed tines, for use as a grappler device.

20 Claims, 9 Drawing Sheets

EXCAVATION ATTACHMENT FOR POWERED LOADER

BACKGROUND OF THE INVENTION

1. Field of the Invention

The present invention relates generally to powered excavation equipment, and more particularly to an attachment for skid loaders, front end loaders, and similar powered machinery. The present excavation attachment is installed in place of the conventional bucket, and serves as a distal fulcrum for lifting, prying, or moving solidly secured objects and hard ground, greatly reducing the likelihood of lifting the opposite end of the machine from the ground when great force is applied. A pair of fixed teeth extend from the attachment to provide localized force in prying and/or breaking up hard materials. In another embodiment, additional opposed and movable teeth are provided opposite the stationary teeth of the attachment, for the attachment to serve as a grapple.

2. Description of the Related Art

Powered excavation machinery, such as skid loaders, front end loaders, etc., are universally equipped with powerful hydraulic units for operating their loader buckets. A hydraulic pump operated by the engine of the machine provides hydraulic fluid under extremely high pressure to the hydraulic cylinders connected to the loader bucket, which are in turn selectively actuated to operate the bucket through its range of motion.

The mechanical force which may be developed by the hydraulic system of such machines can actually exceed the weight of the machine, or at least a large percentage of the weight of the machine. Generally, the weight of the machine distributed opposite the load bucket is somewhat greater than the weight imposed by any load likely to be lifted by the load bucket. However, oftentimes the load bucket (or teeth or tines, if so equipped) is used to pry or force a particularly difficult object loose from the ground, e.g., a large slab of concrete, a tree stump, a buried concrete anchor, etc. When this occurs, the load imposed can greatly exceed the weight of any mass which might be contained in the bucket, and can result in the machine rotating about the fulcrum defined by the wheels closest to the load bucket, lifting the opposite wheels clear of the underlying surface.

This problem would be easily resolved if due only to an excessively heavy mass in the bucket, by dumping some of the mass, but as noted above, the volume of the load bucket is generally not sufficiently large as to hold sufficient weight to produce this overcenter reaction. Such a reaction is almost always due to a stubborn object imbedded in the ground, with the anchoring force adding to the weight of the object to resist lifting by using the load bucket. There is generally no recourse to this problem, other than to attempt to break up the object into smaller pieces, or perhaps get a second machine on the opposite side (if possible), to distribute the load among the two machines rather than having a single machine carry the entire load.

Accordingly, a need will be seen for some means for lifting highly resistant loads from their anchor points, using a powered excavating machine. The present invention responds to this need by means of a generally cylindrical attachment installed transversely in place of the conventional load bucket of a skid loader, end loader, or other powered excavating machine. The device includes a series of (two, or perhaps more) teeth or tines extending generally radially therefrom, for lifting and prying particularly stubborn objects and/or hard ground from the underlying surface or substrate. The present attachment is used by rotating it to orient the teeth somewhat downwardly, and lowering the device (and perhaps driving the machine toward the object) to drive the tines or teeth into or below the object. The attachment is then lowered to the ground and the tines rotated upwardly, to lift the object. The cylindrical shape of the attachment acts as a fulcrum considerably closer to the lifting tines or teeth than the closer road wheels of the machine, thereby providing significantly greater leverage for levering and forcing the object from the underlying surface.

In another embodiment, a set of additional hydraulically actuated tines or teeth may be provided, generally opposed to the first set of fixed teeth. The fixed and movable teeth may be used as a grapple, for lifting difficult to move objects from the underlying surface.

A discussion of the related art of which the present inventor is aware, and its differences and distinctions from the present invention, is provided below.

U.S. Pat. No. 2,608,772 issued on Sep. 2, 1952 to Royal B. Laird, titled "Dual Purpose Ground Working Implement," describes a cylindrical drum disposed transversely from a conventional three point hitch on the back of a tractor or the like. The drum includes a series of different earthworking implements extending from its surface. The drum can be rotated about its transverse axis, with a remotely operated pin serving to lock the drum in a predetermined desired position. The operator releases the lock pin and drives the tractor to roll the drum to position the desired implement downwardly according to the earthworking operation desired, and engages the pin to lock the drum in place. No hydraulic operation is provided, and the device does not act as a fulcrum or provide additional leverage for the machine, but rather merely serves as a multiple purpose earthworking implement.

U.S. Pat. No. 2,837,844 issued on Jun. 10, 1958 to Richard L. Launder, titled "Rooter Attachment For Bulldozers Or The Like," describes a pair of tines or teeth which are removably attachable vertically across the face of the blade of the machine. The teeth extend below the lower edge of the blade, to dig into the underlying surface or substrate for removing roots and similar operations. The Launder attachment teaches away from provision of a fulcrum closer to the earthworking components (tines, etc.), as the blade cannot be rotated upwardly to the extent that a loader bucket can be, and thus cannot provide the fulcrum point provided by the present attachment in concert with an excavating machine.

U.S. Pat. No. 3,596,996 issued on Aug. 3, 1971 to Jack D. Carter, titled "Method And Apparatus For Using A Back Hoe Bucket As A Frozen Ground Ripper," describes a pair of teeth attachable to the back side of a back hoe bucket. The teeth are manually extendible below the bucket for ripping operations, or may be retracted for normal use of the bucket as a scoop or for lighter breaking operations. The Carter arrangement cannot provide any form of fulcrum for the teeth, as they extend essentially below and behind the bucket, between the bucket and nearest wheels.

U.S. Pat. No. 3,778,111 issued on Dec. 11, 1973 to Pio A. Ciofani, titled "Ripper Tooth Attachment For A Backhoe," describes a hook installed to the back of a backhoe bucket for use in breaking up and ripping materials, e. g., concrete slabs, etc., when the bucket is curled under to extend the tooth or hook therebelow. The relationship between the tooth and the bucket precludes use of the bucket as a fulcrum for the tooth, as the tooth or hook is oriented back beneath the bucket, rather than extending outwardly away from the bucket, as in the orientation of the teeth or tines to the drum of the present attachment.

U.S. Pat. No. 3,959,900 issued on Jun. 1, 1976 to Dieter G. Luck, titled "Implement Assembly For Hydraulically Operated Excavators," describes a relatively complex scoop and ripper tooth combination, each independently hydraulically positionable relative to the other. The back of the scoop is disposed upwardly, with no structure disposed between the ripper and the remainder of the machine to rest on the surface for acting as a fulcrum.

U.S. Pat. No. 3,975,844 issued on Aug. 24, 1976 to Rueben C. Olson, titled "Digger Tooth Means For Front Loader Buckets," describes a bucket having an arcuately movable toothed lower forward edge, for use in scarifying operations and where a tooth equipped bucket is of value. The toothed edge extends on arms pivoted at the lower rear of the bucket, and is selectively actuated by a hydraulic cylinder. The only way the Olson device could work in prying loose or lifting an object, would be to rest the bucket on the underlying surface and actuate the hydraulics to raise the toothed edge. The bucket itself, with its heavy duty hydraulics, would not be moved during this operation. However, Olson does not use the heavy hydraulics associated with bucket operation for his movable toothed edge, as the edge need only be moved into and out of position as desired. In contrast, the present system relies upon the conventional heavy duty hydraulics for tilting the bucket (or rather, the present excavation attachment, when installed) to rotate the teeth of the present device, with the cylindrical body of the device serving as a fulcrum.

U.S. Pat. No. 3,999,315 issued on Dec. 28, 1976 to John C. Nye, titled "Adjustable Attachment For A Backhoe," describes an arcuately selectively positionable elongate tooth attachment. The device relies upon mechanical positioning and locking in place, rather than by hydraulic means. No fulcrum is disclosed for providing increased leverage for the device, nor is any opposite structure disclosed for using the device as a grapple.

U.S. Pat. No. 4,541,664 issued on May 1, 1979 to Nicholas Maura, titled "Ripper Attachment For Backhoe Or Front End Loader," describes a multiple tooth attachment immovably bolted into the otherwise conventional bucket of the machine. The teeth extend to the front of the bucket, but are spaced above the lower forward edge of the bucket. This enables material dislodged by the teeth, to fall into the bucket. In contrast, the present excavation attachment comprises a closed cylinder configuration, with the extended tines or teeth being welded to the exterior surface of the cylinder. The cylindrical surface of the present attachment provides a far better fulcrum than the conventional bucket of the Maura assembly, for using the teeth to lift and dislodge objects.

U.S. Pat. No. 4,327,509 issued on May 4, 1982 to Rufus C. Bean, titled "Ripper Tooth Attachment For A Back Hoe," describes a hydraulically actuated set of teeth which are pivotally mounted above the bucket. Bean recognizes the problem of leverage with relatively elongate boom structures in backhoes, end loaders, and the like, but responds to the problem with an entirely different, and more complex, solution. Bean rests the machine bucket on the underlying surface, and then hydraulically actuates the teeth to perform the dislodging operation. In contrast, the teeth of the present attachment are permanently and immovably affixed to the cylindrical body of the device, with no other hydraulics being required. The operator need only actuate the controls as in "curling" the bucket, to lever the teeth around the fulcrum defined by the lower portion of the cylinder.

U.S. Pat. No. 4,333,250 issued on Jun. 8, 1982 to Joe W. Henderson, titled "Multi-Purpose Attachment For Vehicles," describes a bucket or scoop which is removably attachable to the back of a small garden tractor or the like by a three point hitch. The device has a few different positions, which may be selected and locked into place by an upwardly extending handle which is manually operated by the operator of the tractor. The device may be rotated about its lateral axis to turn the open side upwardly for use as a container or scoop, or rotated to dispose one open edge downwardly for use as a scraper blade. However, Henderson does not provide any teeth or tines for his device, nor does he provide any means of lifting or lowering the device nor of rotating the device by means of hydraulic power, as provided by the present invention.

U.S. Pat. No. 4,618,005 issued on Oct. 21, 1986 to Douglass G. Tower, titled "Orientable Ripper," describes a rotatable transverse arm having a tooth or tine extending from the distal end thereof. The arm may be rotated hydraulically to adjust the angle of the tooth as desired, for ripping operations. No other structure for placement upon the underlying surface is disclosed, for providing a fulcrum for the ripping tooth of the Tower U.S. Patent. The device is primarily intended for attachment to the blade arm ("bull arm") of a bulldozer, rather than to the scoop or bucket of an end loader, skid loader, or similar earthworking machine.

U.S. Pat. No. 4,749,048 issued on Jun. 7, 1988 to Joseph L. Kelly, titled "Ripper Attachment For Skid Steer Loaders," describes a tooth extending downwardly from a triangulated frame, which is in turn secured to the conventional lift arms of a skid steer loader. No fulcrum is provided by Kelly for his ripper attachment, nor is any hydraulic operation provided other than by the conventional lift arms of the skid steer device. The ripping tooth of the Kelly device is oriented downwardly, and cannot be used for lifting or dislodging an object in an upward direction, as provided by the present attachment. Thus, Kelly does not require any form of fulcrum for his attachment, as use of the device would tend to lift the nearest wheels, rather than applying more downward force to them, as in a lifting operation with a conventional end loader.

U.S. Pat. No. 4,845,867 issued on Jul. 11, 1989 to Allan J. Albrecht, titled "Triple-Purpose Attachment," describes a hydraulically powered, auxiliary arm having ripping teeth at its distal end. The arm is secured to or immediately adjacent the upper edge of the loader bucket of an excavating machine, and serves as a scarifying or breaking device as well as acting as a grapple in combination with the bucket as desired. As the device is mounted above the bucket, it cannot use the bucket as a fulcrum for levering objects from the underlying surface, as provided by the present invention. Moreover, the Albrecht device works against the existing bucket as a grapple, rather than against one or more teeth or tines extending from a common element (e. g., the cylinder of the present attachment).

U.S. Pat. No. 6,023,863 issued on Feb. 15, 2000 to Steven D. Mahin, titled "Frost Hook Attachment For Backhoe," describes a link for attaching an underslung frost hook beneath a backhoe bucket. The frost hook is immovably affixed relative to the bucket, with the two components moving in unison with one another when the bucket is articulated; no grappling or grasping means is provided between the hook and the bucket. As the hook is disposed in front of and below the bucket when the bucket is in its folded or "curled" position, the device cannot utilize the bucket as a fulcrum for lifting or prying objects from the underlying surface, as provided by the present excavating attachment.

Moreover, as the hook is immovably affixed relative to the bucket, it cannot be used as a grappling device, as provided in at least one embodiment of the present invention.

Finally, British Patent Publication No. 2,083,110 published on Mar. 17, 1982 to Trevor R. Salmon, titled "Ripper Attachment For Excavator," describes an assembly which is quite similar to that described immediately above in the '863 U.S. Patent to Mahin. The same points of difference noted above between the Mahin '863 U.S. Patent and the present invention, are seen to apply here as well.

None of the above inventions and patents, taken either singularly or in combination, is seen to describe the instant invention as claimed. Thus, an excavation attachment for powered loader solving the aforementioned problems is desired.

SUMMARY OF THE INVENTION

The present invention is an excavation attachment for a powered loader, e. g., skid steer loader, front end loader, etc. The present attachment essentially comprises a transverse cylinder having one or more (preferably two) teeth or tines extending generally radially therefrom, for use in prying stubborn objects from the ground or other underlying surface, or for scarifying and breaking up a hard packed surface, etc. The bottom of the cylindrical shape of the device acts as a fulcrum immediately adjacent to the extended teeth or tines, thus providing a considerably shorter arm and accordingly greater leverage than that achieved with a standard skid loader or end loader configuration.

Such loaders conventionally use the entire load bucket as the lifting device, with the fulcrum for the operation comprising the tires of the loader closest to the bucket. While the hydraulic actuation generally develops sufficient power to move the lifting booms or arms relative to the loader vehicle, the distance between the bucket and the nearest tires can provide a sufficiently long lever arm to raise the opposite end of the loader from the underlying surface. The present invention, by effectively moving the lever arm considerably closer to the lifting or levering teeth or tines than is the case with conventional loaders, alleviates this leverage problem and results in considerably more effective operations for lifting, prying, and otherwise moving stubborn objects (e. g., imbedded chunks of concrete, stumps, rocks, etc.) from the underlying surface.

A second embodiment of the present invention includes a pair of hydraulically actuated tines disposed opposite the fixed tines extending from the drum or cylinder. These movable tines or teeth are actuated hydraulically by the operator of the machine, using conventional hydraulic controls and hydraulic cylinders or struts. The opposed fixed and movable teeth or tines, enable the present invention to serve as a grappler when desired. The device still functions in its original function as a prying, levering, and scarifying tool, by raising the movable tines away from the fixed tines so they are clear to perform the desired operation.

Accordingly, it is a principal object of the invention to provide an excavation attachment for use with skid steer loaders, end loaders, and similar powered excavation and loading machines.

It is another object of the invention to provide such an excavation attachment comprising a laterally disposed cylinder having means for removable attachment to the conventional loader bucket attachment fittings of the machine, and including one or more tines or teeth extending generally radially from the cylinder.

It is a further object of the invention to provide such an excavation attachment wherein the transverse cylinder serves as a fulcrum for levering objects from the underlying surface, providing a shorter lever arm than conventional machines and alleviating or precluding lifting of the opposite end of the machine.

Still another object of the invention is to provide such an excavation attachment including one or more hydraulically actuated tines opposite the fixed tines, for use as a grappler device.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of an excavation attachment for use in combination with various types of conventional powered loaders, such as skid steer loaders, front end loaders, tracked machinery with tiltable blades or buckets, and other related powered excavation and earth moving machinery and equipment. The present excavation attachment essentially includes a generally cylindrical fulcrum with at least one (preferably a pair of) tine(s) extending outwardly therefrom, for lifting and prying imbedded objects (tree stumps, large rocks, imbedded concrete masses, etc.) from the ground.

Figure 1:
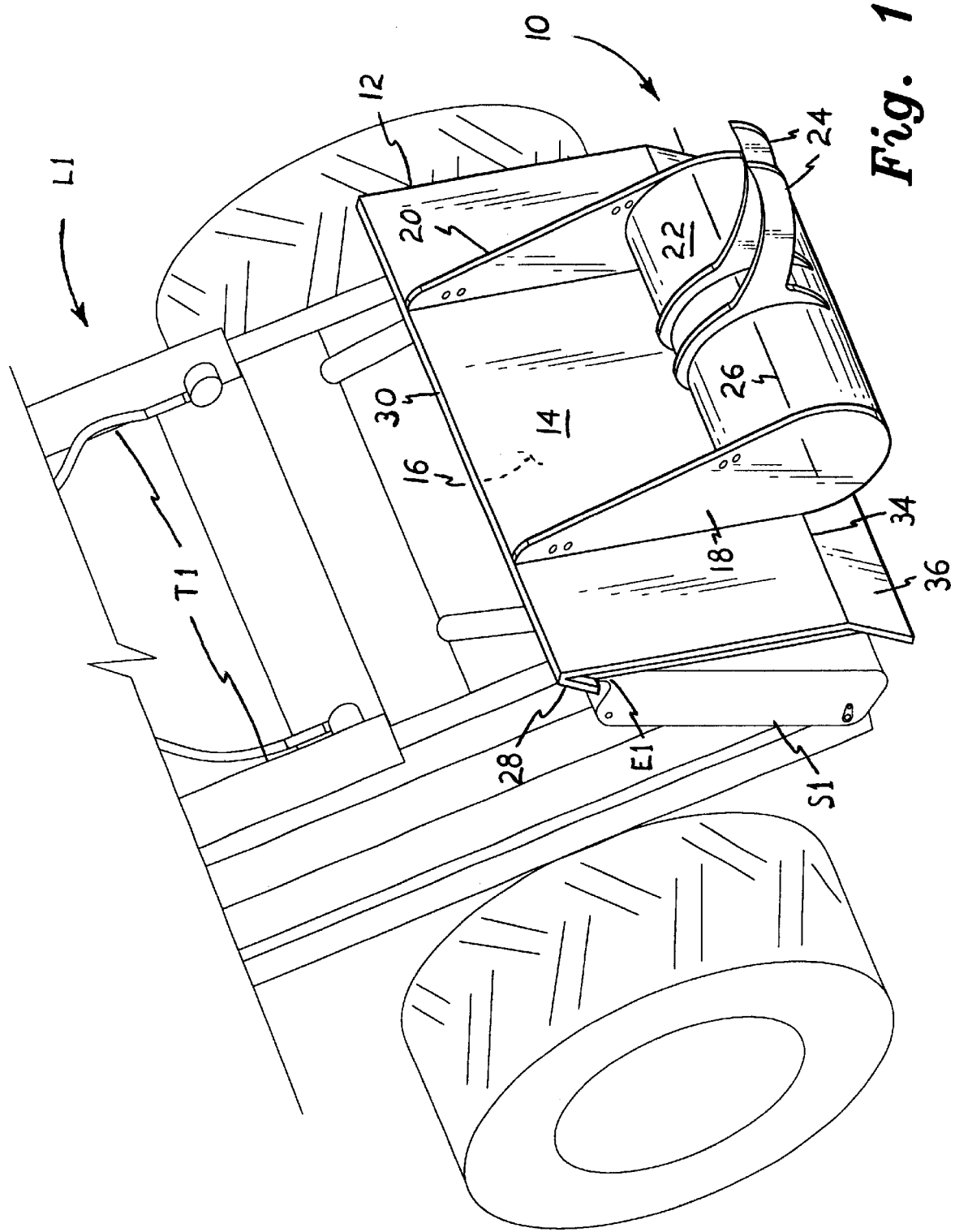
FIG. 1 is an environmental, front perspective view of an excavation attachment for a powered loader according to the present invention, attached to the front of a skid steer loader machine.
Figure 6:
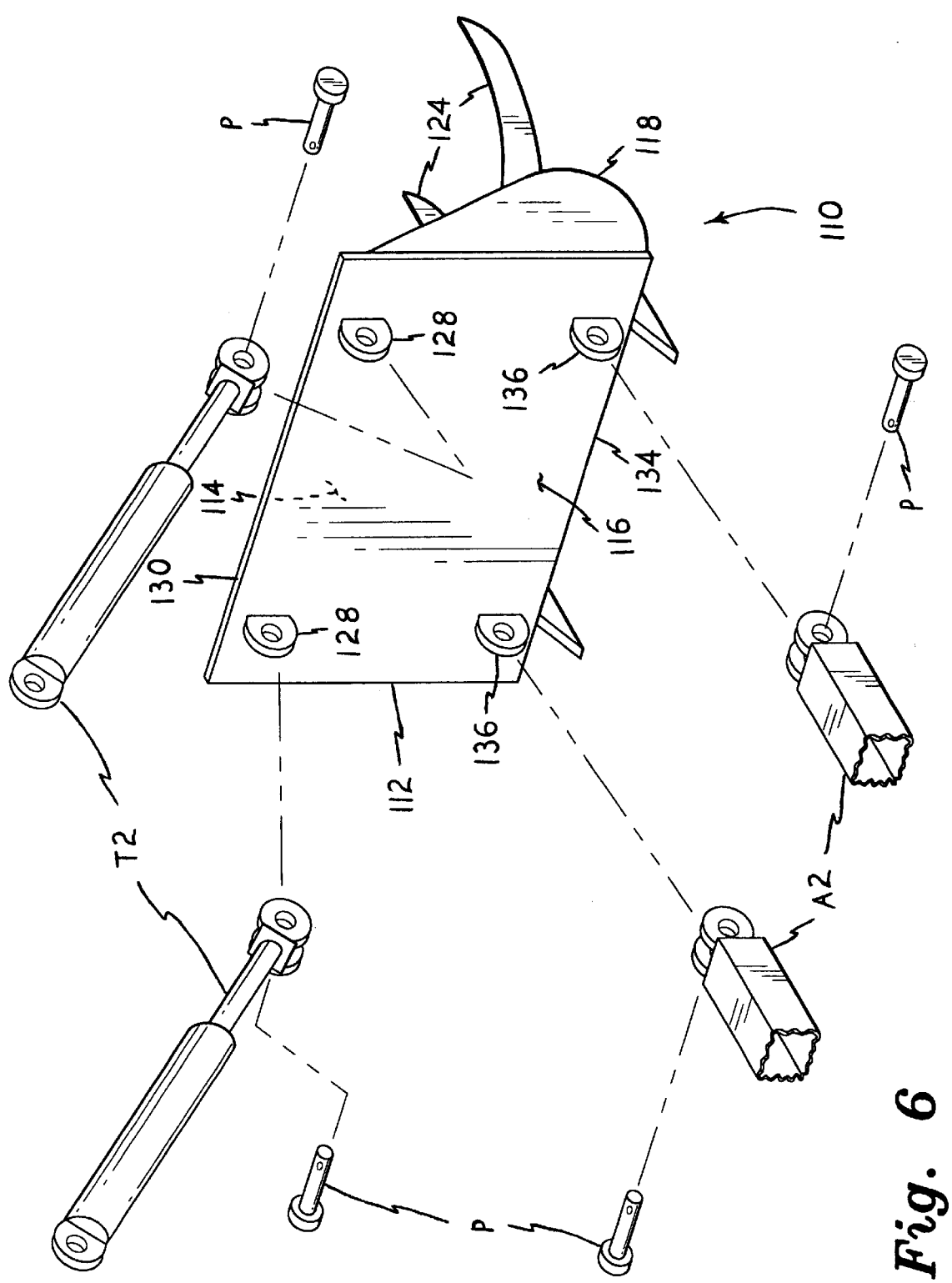
FIG. 6 is an exploded perspective view of a second embodiment of the present excavation attachment, showing alternative loader attachment means.

FIG. 1 of the drawings provides an illustration of a first embodiment of the present excavation attachment, designated by the reference numeral 10. The excavation attachment 10 of FIGS. 1 through 4 has a rearward structure adapted for removable attachment to the conventional bucket or blade attachment structure of a skid steer loader, i. e., an excavation or earth moving machine in which the wheels are differentially braked and driven on opposite sides of the machine to turn the machine, rather than turning the wheels at one end of the machine. It will be seen that the present excavation attachment may be easily reconfigured for attachment to other types of attachment fittings found on other types of excavation machines or loaders as well, as illustrated in FIG. 6 of the drawings and discussed further below.

The various excavation attachment embodiments of the present invention each have the same basic structure or configuration. The excavation attachment 10 of FIGS. 1 through 4 includes an adapter backing plate 12 having a working face 14 from which the working components of the present excavation attachment extend, and an opposite loader attachment face 16, shown in FIG. 2 of the drawings. The specific loader attachment means for the various embodiments are discussed in detail further below. The working face 14 of the backing plate 12 includes laterally spaced first and second fulcrum arms, respectively 18 and 20, extending forwardly therefrom, with a fulcrum 22 disposed laterally between the two fulcrum arms 18 and 20. One or more (preferably two) lever tines or teeth 24 extend forwardly from the fulcrum 22.

The above described structure is preferably formed of heavy steel plate to provide the required strength and durability for excavation and earth moving equipment. The various assemblies, i.e., backing plate 12, fulcrum arms 18 and 20, fulcrum 22, and lever tines 24, are immovably affixed to one another, preferably by welding. The fulcrum 22 may be formed of a length of heavy wall steel pipe in order to provide the preferred cylindrical shape for that component, with the axial center 26 of the cylindrical fulcrum extending laterally between the two fulcrum arms 18 and 20. The rounded outer surface of the cylindrical fulcrum 22 serves to roll upon the underlying surface as the tines 24 are tilted by means of the conventional tilt mechanism T1 of the conventional skid steer loader L1, illustrated partially in FIGS. 1, 3, and 4.

Figure 2:
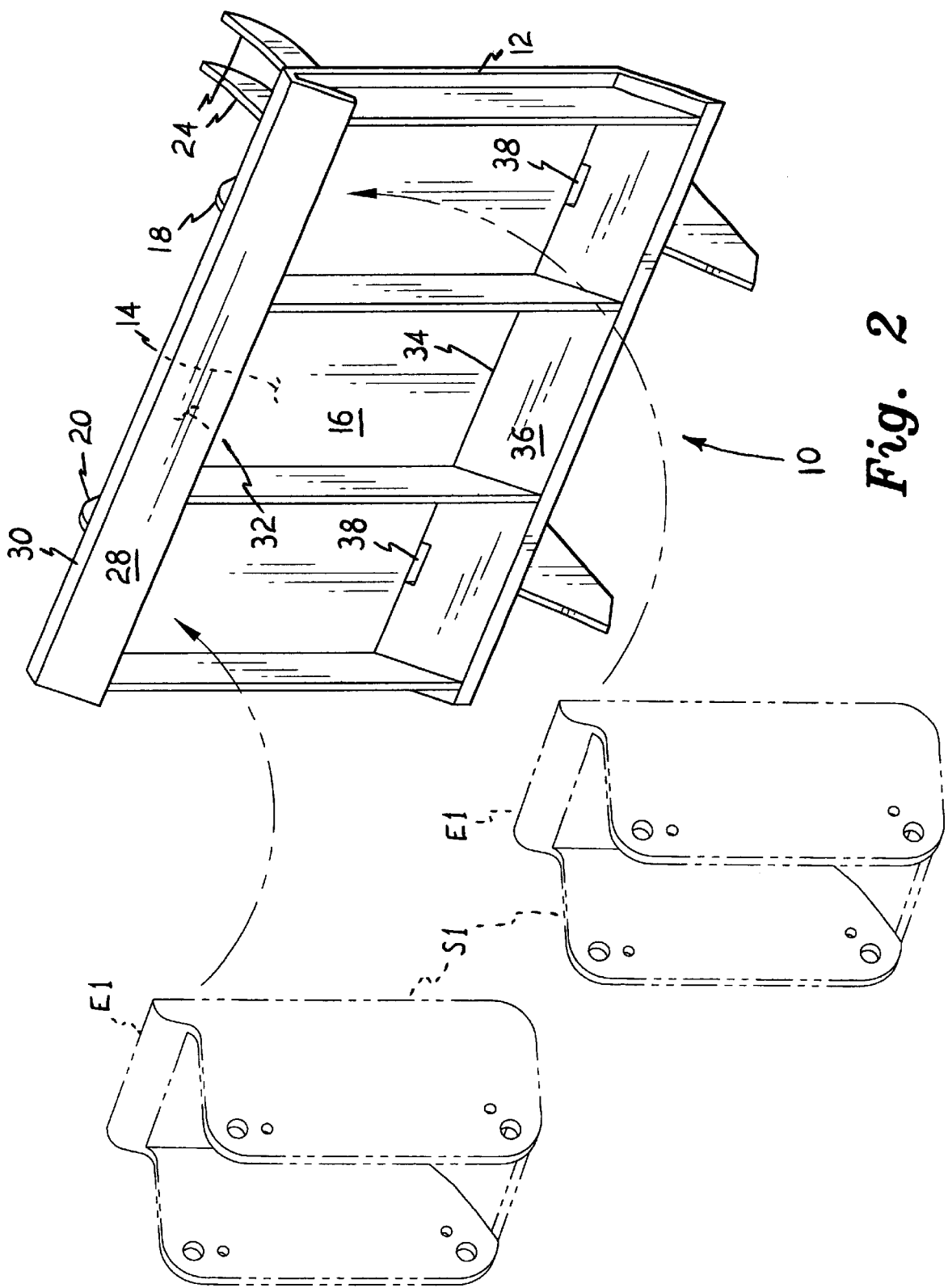
FIG. 2 is an exploded rear perspective view of the present excavation attachment, showing one loader attachment means therefore.

The excavation attachment 10 of FIGS. 1 through 4 is secured to the conventional skid loader L1 by conventional attachment shoes Si (shown in broken lines in FIG. 2). The attachment backing plate has a flange 28 extending downwardly and rearwardly from the backing plate upper edge 30 defining a pocket 32 between the flange 28 and upper portion of the backing plate 12. The upper edges E1 of the two attachment shoes S1 fit or "hook" into this pocket 32, with the excavation attachment 10 essentially being suspended from the two attachment shoes S1 of the loader L1. The lower edge 34 of the excavation attachment 10 includes a second flange 36 extending downwardly and rearwardly therefrom, in which a pair of receptacles 38 are formed to accept corresponding conventional attachment pins (not shown) for conventionally securing a loader bucket to the loader.

Figure 3:
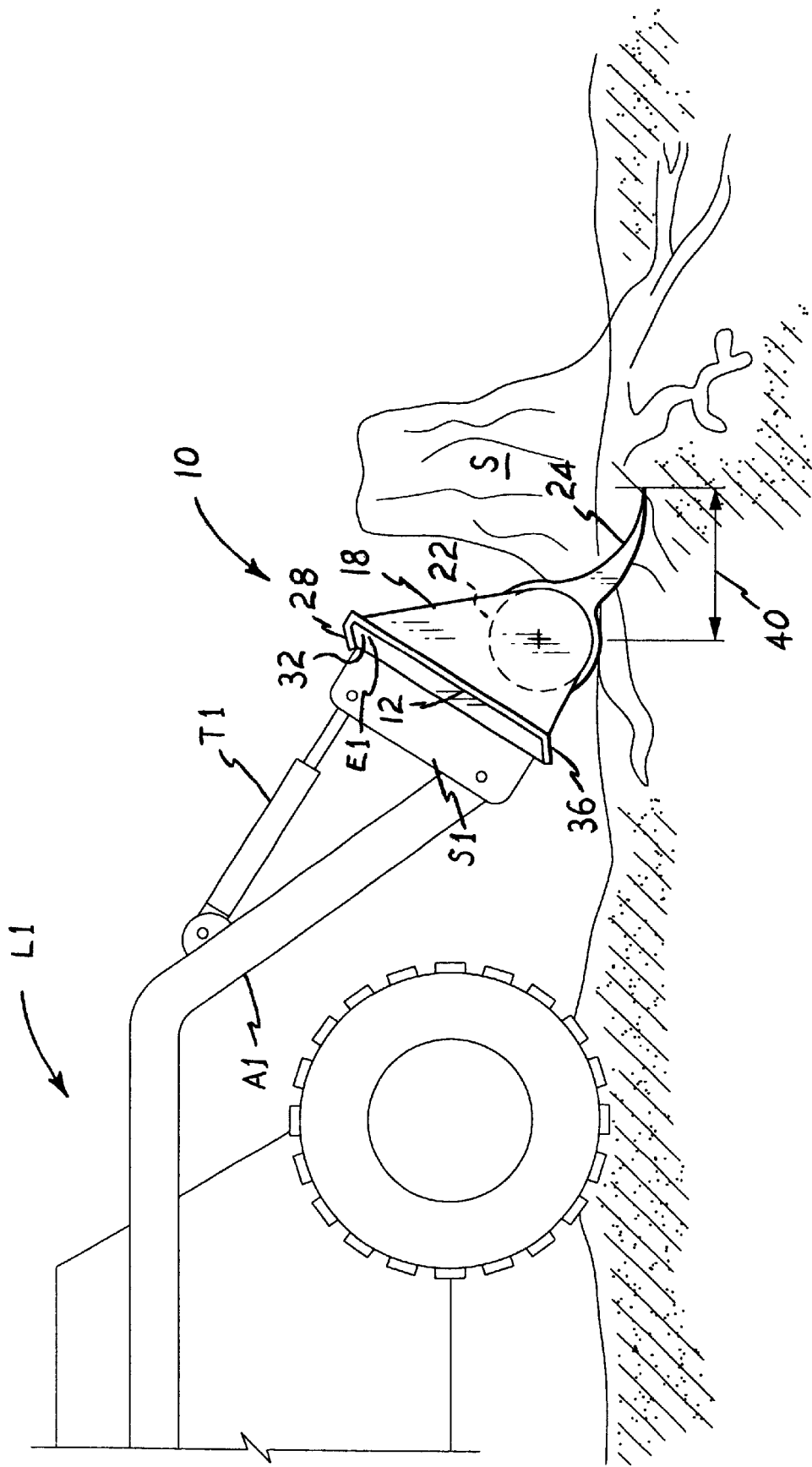
FIG. 3 is a side elevation view of the first step in the removal of an object imbedded in the ground, using the present excavation attachment.
Figure 4:
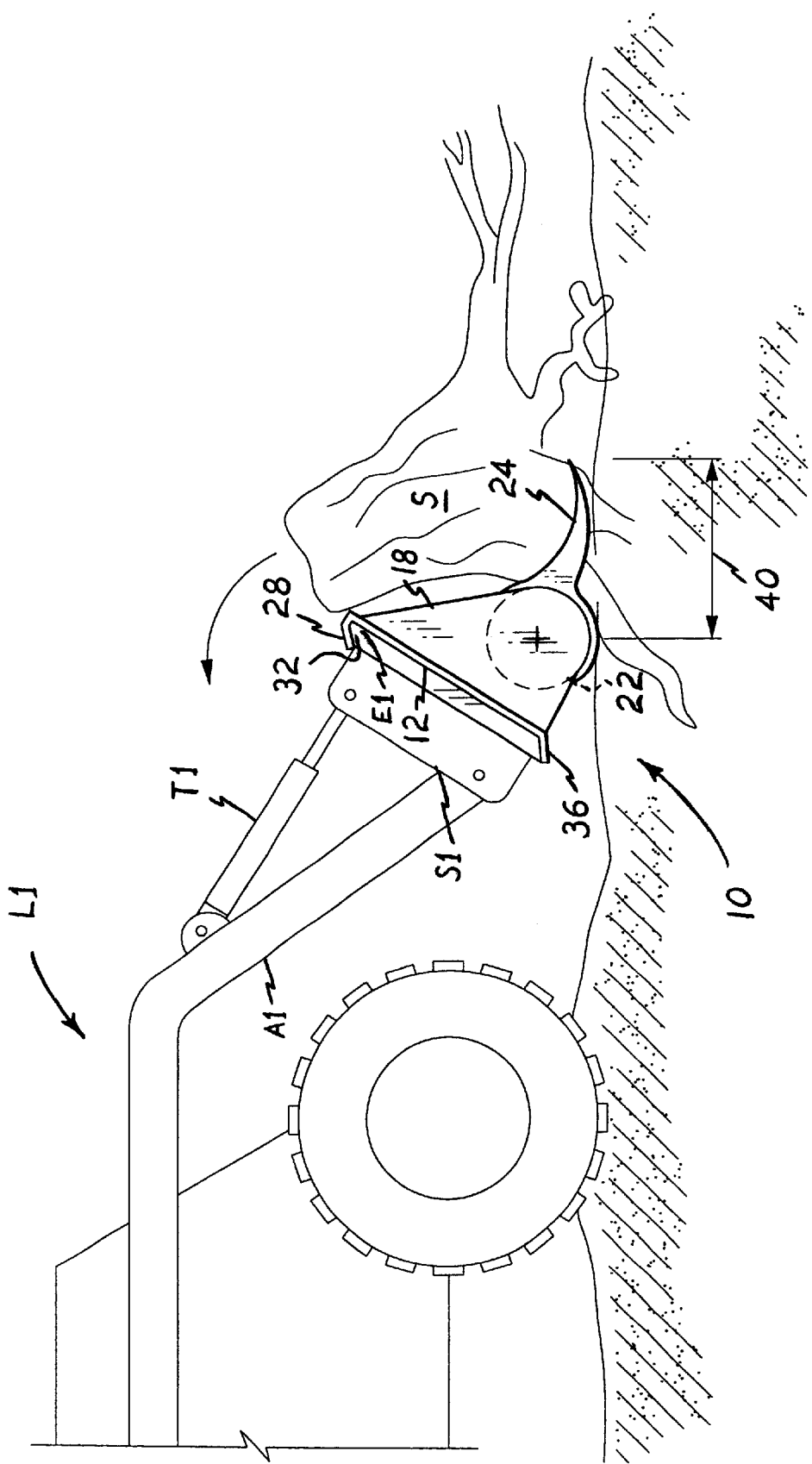
FIG. 4 is a side elevation view of the second step in the removal of an imbedded object, showing the rotation of the attachment and object about the fulcrum of the attachment.

FIGS. 3 and 4 illustrate the operation of the present excavation attachment 10 in removing an imbedded object from the ground, e. g., a tree stump S. In FIG. 3, the machine operator has lowered the attachment 10 so the fulcrum drum 22 is resting upon the underling surface and driven the loader L1 forward with the tines 24 of the attachment 10 lowered, to drive the tines 24 beneath the object (e. g., stump S) to be removed. This places the tines 24 somewhat beneath the object to be removed, with the fulcrum 22 remaining just beyond the object. The relatively short lever arm 40, defined by the distance between the ends of the tines 24 and the center of the fulcrum cylinder 22, provides a significant mechanical advantage for levering and prying imbedded objects from the material in which they are imbedded.

At this point, the operator of the loader L1 need only operate the conventional tilt mechanism T1 to tilt or rotate the attachment 10 and its tines or teeth 24 upwardly, i. e., counterclockwise as shown from the right side elevation view of FIG. 4, thereby levering the object S from the underlying surface. The actual rotation axis of the device extends laterally through the distal ends of the two conventional lift arms A1 of the loader L1, but the operator may lower the lift arms A1 as required during the tilt operation in order to keep the fulcrum drum 22 of the attachment resting on the surface. By moving the fulcrum forwardly of the loader L1 itself, the loader L1 maintains its position on the underlying surface to provide a solid and secure operating platform for the removal operation.

Figure 5:
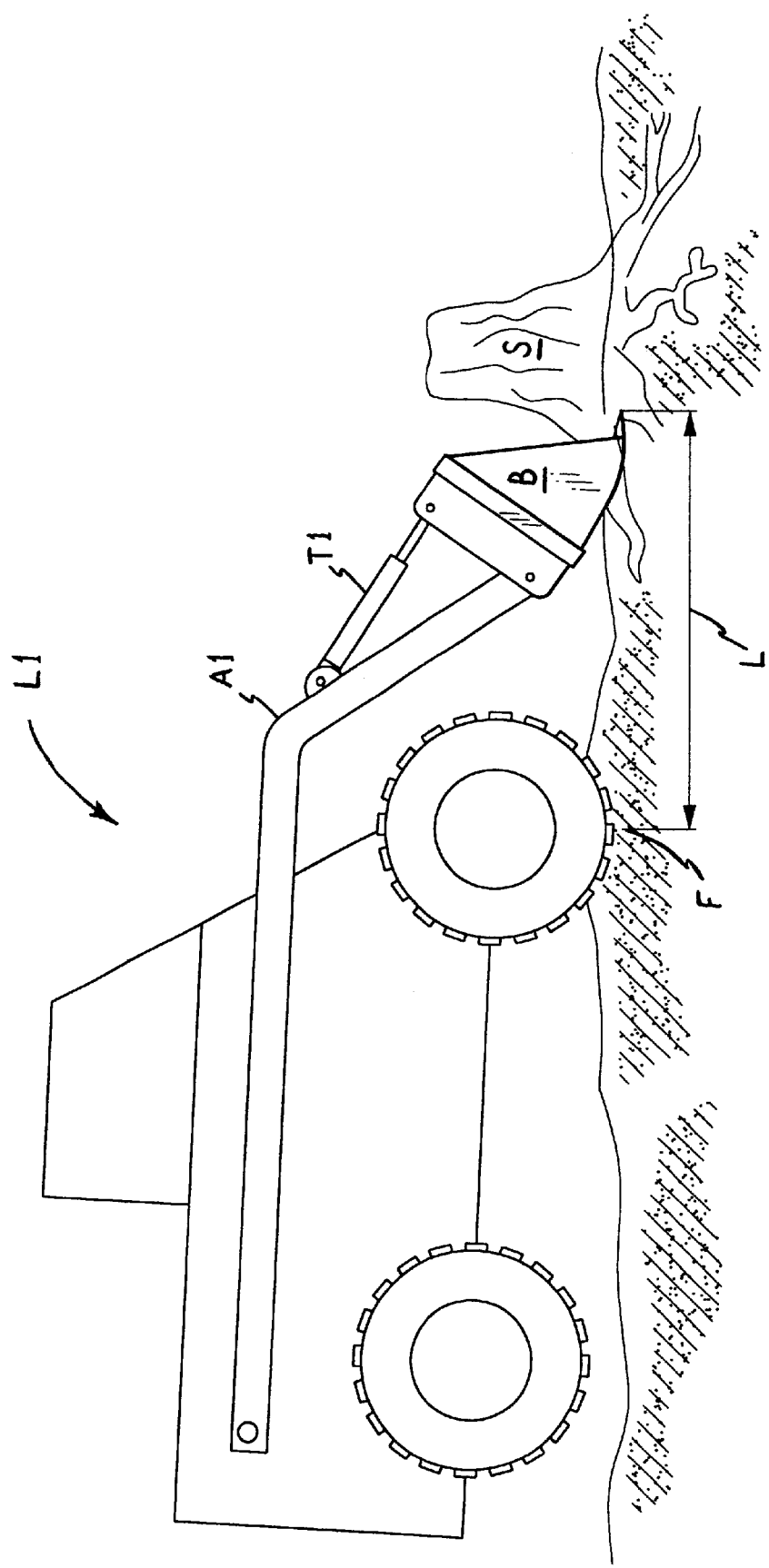
FIG. 5 is a side elevation view of an attempt to remove such an imbedded object using a loader bucket of the prior art, illustrating the much longer arm defined by the distance between the front wheels of the loader and the bucket edge.

Prior art FIG. 5 illustrates the disadvantage of conventional systems, wherein a conventional loader L1 is equipped with a conventional loader bucket B. Such buckets B may be equipped with tines or teeth extending forwardly therefrom, as taught particularly by Maura in his U.S. Pat. No. 4,151,664, discussed in detail in the discussion of the related art further above. However, such tines or teeth and the bucket B act as an extension of the lift arms A1, with the shape of the bucket B being adapted for scooping and carrying a load of material, rather than as a fulcrum about which the device may be rotated. As such, the fulcrum F of such a conventional system becomes a lateral line on the surface upon which the front wheels or tires are resting, with a correspondingly long lever arm L, as illustrated in FIG. 5.

It will be seen from a review of FIG. 5 that the placement of the fulcrum F of the system at the front tires of the loader L1, results in significantly less mechanical advantage for the bucket B1 due to the longer lever arm L. Moreover, the distance from the fulcrum F defined by the front tire contact points to the rear tires results in a shorter distance therebetween, with a correspondingly shorter distance between the center of mass of the loader L1 and the fulcrum F. This provides a greater mechanical advantage for a resultant force to lift the rear end of the loader L1 from the underlying surface as the lift arms A are raised in an attempt to uproot the stump S or other object, thus limiting the amount of lifting force which may be applied to the stump S or object and greatly reducing the stability of the loader L1.

To this point, the present invention has been described with means for removably securing the device to the conventional bucket attachment of a conventional skid steer loader. However, the present invention may be readily adapted for attachment to and use with a wide variety of different powered loading and earth moving machines and equipment. FIG. 6 illustrates a different embodiment of the present excavation attachment, designated as attachment 110 for use with conventional bulldozers, front end loaders, and other such conventional powered loaders or earth moving equipment wherein the bucket or other attachment secures to one or more upper tilt actuators T2 and one or more lower lift arms A2 extending therefrom, with pivot attachment pins P securing the tilt actuators T2 and lower lift arms A2 to the excavation attachment 110. (Additional crossmembers, not shown, may be provided between the tilt actuators T2 and lift arms A2, depending upon the machine.)

In FIG. 6, the excavation attachment 110 has a backing plate 112 with a working face 114, a loader attachment face 116, an upper edge 130, and an opposite lower edge 134. A pair of fulcrum arms extend from the working face 114 (with only the first fulcrum arm 118 being shown in the rear perspective view of FIG. 6). A pair of tines or teeth 124 extends forwardly from the fulcrum (not shown in the rear perspective of FIG. 6). It will be seen that the configuration of the excavation attachment 110 of FIG. 6 is essentially the same as that of the attachment 10 of FIGS. 1 through 4, with the exception of the loader attachment fittings extending from the attachment face 116 of the backing plate 112.

The attachment fittings for the excavation attachment 110 of FIG. 6 comprise at least one tilt actuator attachment lug 128 adjacent the upper edge 130 of the backing plate 112, and at least one laterally disposed pivot attachment pin receptacle 136 adjacent the lower edge 134 of the backing plate 112. Preferably, two (or perhaps more) laterally spaced upper attachment lugs 128 and lower pin receptacles 136 are provided, as shown, for stability. The upper fittings 128 are removably installable to the respective conventional load bucket tilt actuator arms T2 of the machine (conventional front end loader, bulldozer, etc.), while the lower attachment pin receptacles or fittings 136 secure removably to the load bucket attachment arms A2 of the machine, about which the excavation attachment 110 pivots when the tilt actuators T2 are operated. Each of the fittings 128 and 136 is secured to its corresponding tilt actuator T2 or lift arm A2 conventionally by a pin P. It should again be noted that the two systems disclosed for attaching the present excavation attachment to a powered loader or other machine are exemplary, and that many other attachment systems may be used with the present invention, according to the specific type of machine with which the present attachment is to be used.

To this point, the embodiments of the present excavation attachment have been constructed as essentially unitary, monolithic structures, with all components being immovably and permanently affixed to one another, as by welding, etc. However, the present excavation attachment also lends itself to the addition of one or more movable jaws or grapples thereto, for even further versatility.

Figure 7:
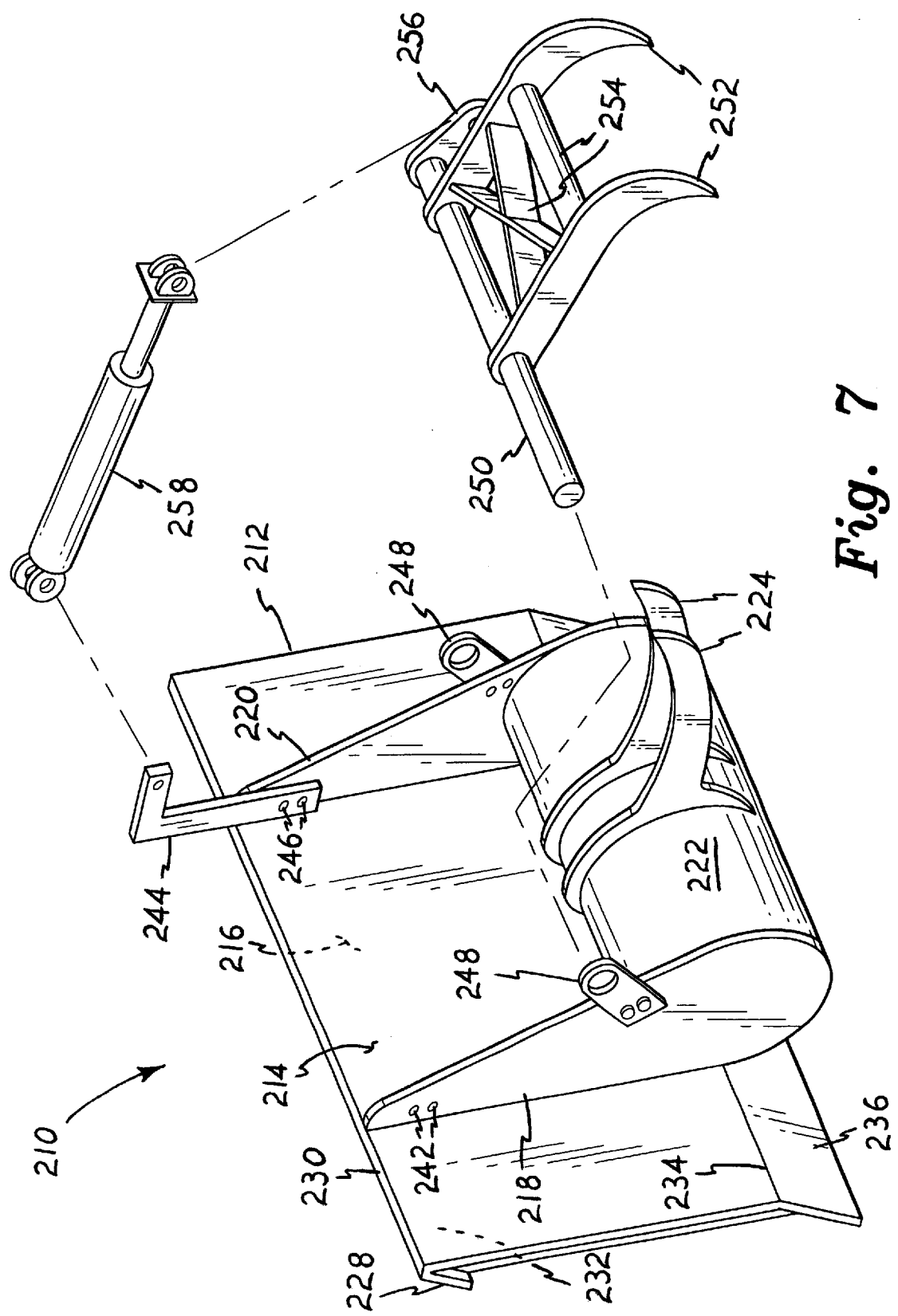
FIG. 7 is an exploded perspective view of a third embodiment of the present excavation attachment, showing the addition of hydraulically actuated grappling tines thereto.
Figure 8:
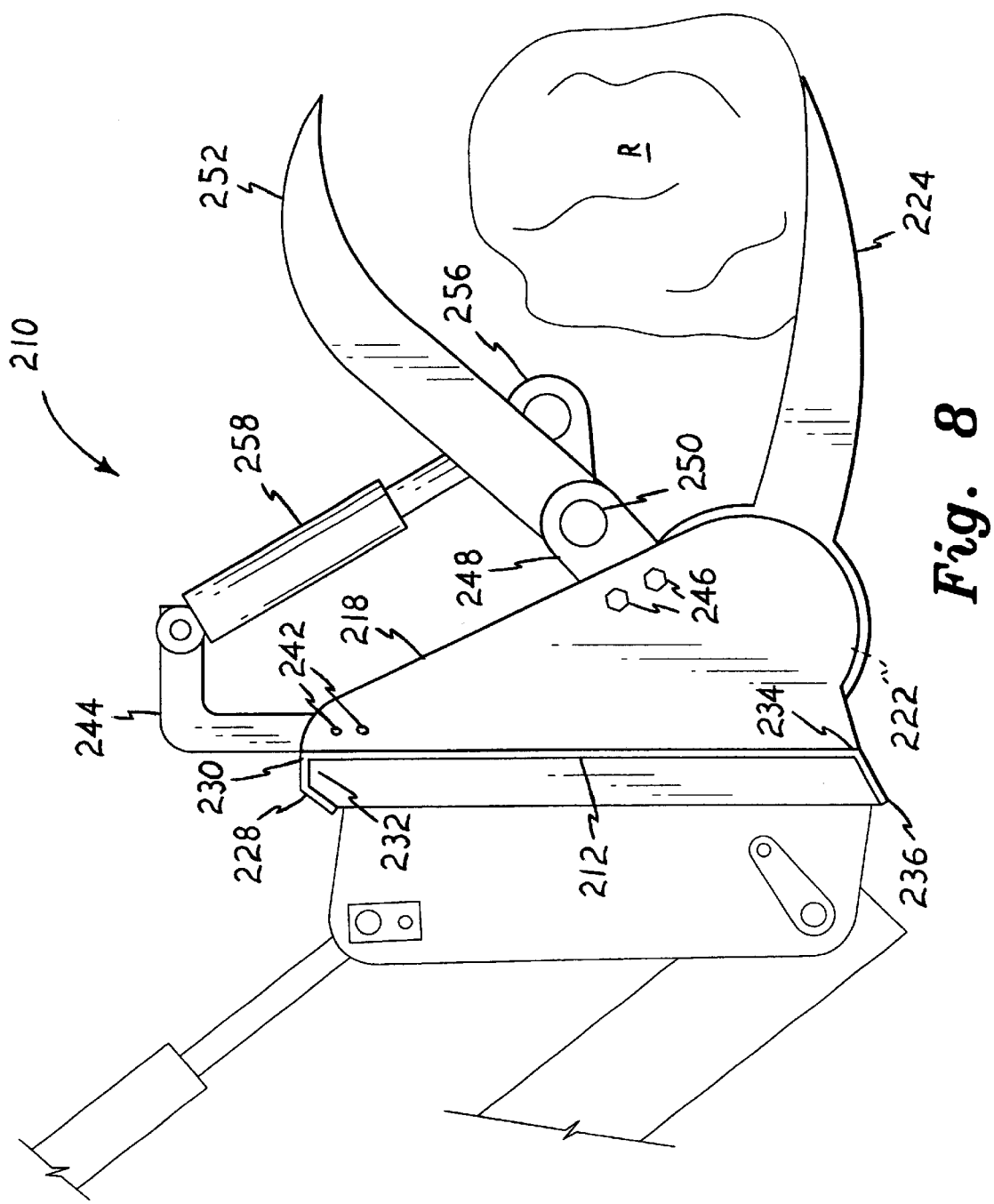
FIG. 8 is a side elevation view of the operation of the embodiment of FIG. 7, showing the first step in the removal of a large object using the power actuated tine embodiment.
Figure 9:
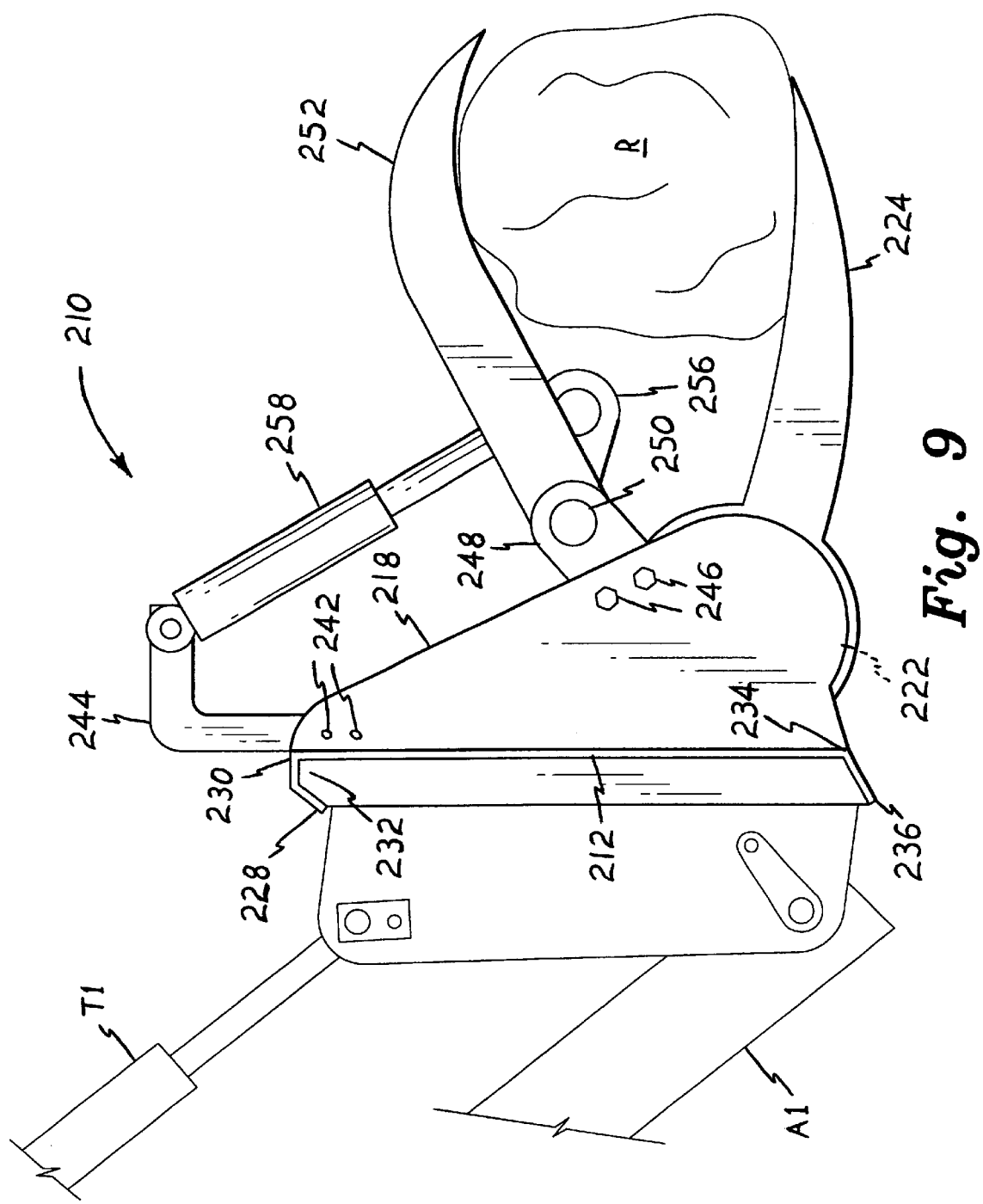
FIG. 9 is a side elevation view of the second step in the removal of a large object using the power actuated tine embodiment, showing the closure of the tines around the object.

FIGS. 7 through 9 illustrate this third embodiment of the present invention, designated as excavation attachment 210. The excavation attachment 210 comprises essentially the same components as the attachments 10 and 110 described further above and illustrated in FIGS. 1 through 4 and 6 of the drawings, having a backing plate 212 with a working face 214 and an opposite attachment face 216, with a pair of fulcrum arms, respectively 218 and 220, extending outwardly therefrom. A fulcrum 222 (cylinder, drum, or other shape) is affixed laterally between the two fulcrum arms 218 and 220, with one or more (preferably a pair) of tines or teeth 224 extending outwardly from the fulcrum 222, as in the excavation attachments of FIGS. 1 through 4 and FIG. 6.

While the excavation attachment 210 of FIGS. 7 through 9 includes attachment fittings for use with the skid steer loader L1 of FIGS. 1 through 4, i. e., an upper flange 228 extending from the upper edge 230 of the backing plate and defining an attachment pocket 232 with the backing plate lower edge 234 having a lower flange 236 extending therefrom, it will be seen that the attachment fittings of the excavation attachment 110 of FIG. 6, or other attachment means, may be provided for the excavation attachment 210 of FIGS. 7 through 9 as desired. Other fittings, e. g., the lower flange receptacles 38 of the first embodiment illustrated in FIG. 2, are not visible in the front perspective view of the excavation attachment 210 of FIG. 7.

It will be noted that the first fulcrum arm 218 includes a pair of bolt holes 242 adjacent the upper end thereof, as do the two fulcrum arms 18 and 20 of the first embodiment shown in FIG. 1. While these are not necessary in the first fulcrum arm 218, the fulcrum arms 218 and 220 may be manufactured identically in order to provide such holes 242 for the second arm 220, where they are used to secure a brace arm 244 for the attachment of a grapple actuating arm or cylinder thereto by means of conventional bolts 246. The provision of such attachment holes (and others as required) in the fulcrum arms 18 and 20 of the first embodiment, as well as for other embodiments, allows the power operated grapple assembly to be bolted to such excavation attachments not previously provided with such equipment.

The two fulcrum arms 218 and 220 also include additional bolt holes for the bolted attachment of a pair of lugs 248 for pivotally holding the laterally disposed axle 250 of the grappling tine assembly. Again, the holes provided for the attachment of the grappling tine axle lugs may be provided for other embodiments of the present invention, in addition to the embodiment illustrated in FIGS. 7 through 9. The two lugs 248 are also secured to their respective fulcrum arms 218 and 220 by bolts 246, as shown in FIGS. 8 and 9. Alternatively, the actuator brace arm 244 and one of the axle lugs 248 may be permanently affixed (welded, etc.) to their respective fulcrum arms if so desired, but at least one of the two axle lugs 248 must be removable, in order to allow for installation of the grappling tine axle 250 across the two lugs 248.

One or more (preferably a laterally symmetrically disposed pair) grappling tines 252 extend outwardly from the grappling tine axle 250, and are preferably curved oppositely to the curvature of the fixed lever tines 224 extending from the fulcrum 222. This allows the fixed tines 224 and movable grapple tines 252 to grip an object securely therebetween, without the object slipping outwardly from between the tine assemblies 224 and 252. Preferably, additional diagonal and/or lateral bracing 254 is provided between the two grappling tines 252, to provide a rugged and durable structure. An axle operating arm 256 extends from the axle 250, to which one end of a grapple tine actuating cylinder 258 is pivotally secured. The cylinder 258 may be secured between the brace arm 244 and the axle operating arm 256 by means of conventional pins, such as the pins P illustrated in FIG. 6 of the drawings.

FIGS. 8 and 9 illustrate the operation of the excavation attachment embodiment of FIG. 7. In FIG. 8, the loader machine has been operated to drive the fixed lever tines 224 beneath a large and heavy object (e. g., a rock R) to be removed from its imbedded site or otherwise moved. The fixed lower lever tines 224 may be used as described further above to pry or lever the rock R or other large and heavy object from its imbedded location, if required. The grapple tine actuating cylinder 258 is retracted in order to hold the grapple tines 252 in their open position, to allow the rock R or other object to fit between the two sets of tines or teeth 224 and 252.

Once the lower fixed lever tines 224 have been inserted beneath the rock R, the movable grappling tines 252 are lowered by means of the grapple tine actuating cylinder 258 to grip the rock R (or other object) securely. The rock R or other object may then be moved to another location as desired, by lifting the excavation attachment assembly 210 by means of the lifting arms A1 and maneuvering the powered loader machine as required.

In conclusion, the present excavation attachment embodiments provide a much needed tool for working loose imbedded stumps, roots, rocks and stones, concrete, and other large, heavy, and difficult to remove objects from their imbedded or seated locations in the ground. The present attachment enables the operator of the end loader or other machine equipped with the present invention, to use the mechanical advantage provided by the short lever arm of the attachment to lever various otherwise difficult to dislodge articles from the ground. Heretofore, attempts at dislodging such articles resulted in the hydraulics of the powered machine applying sufficient hydraulic pressure to actually lever or lift the rear of the machine clear of the ground, in view of the relatively long moment arm provided by lift buckets and tines of the prior art with their fulcrums located at the front wheels of the machine and the relatively short moment arm between the center of gravity of the machine and the front wheels. The present attachment provides a solution to this problem, by providing a fulcrum integrated with the lever tines of the device to define a relatively short moment arm which is independent of the wheels of the loader machine.

The present excavation attachment enables a single operator of a single skid loader, end loader, or other similar machine, to demolish relatively large concrete slabs without need of a second loader and operator. In the past, the mass and size of a concrete slab often made it impossible for a loader operator to pick up one edge or corner of the slab in order to break up the slab across its unsupported center area. Instead, the slab would hold the loader bucket while the loader's opposite end was lifted from the surface. It would then become necessary to get a second loader to assist in lifting the concrete. With the present excavation attachment, a single loader and operator may easily pry the concrete slab upwardly along one edge, by means of the fulcrum of the attachment bearing upon the surface very close to the tines and the material being lifted. The loader wheels remain in contact with the surface, as they are independent of the fulcrum of the attachment until the attachment is lifted by the lift arms of the machine.

The present excavation attachment provides further versatility when equipped with movable grappling tines or jaws, as illustrated in FIGS. 7 through 9. This enables the present invention to be used not only for levering or prying objects from the underlying surface but also for securely gripping large, massive, and/or bulky objects for transporting those objects to another location after they have been removed from the underlying surface. Accordingly, the present invention will prove to be a valuable addition to the equipment of any excavation or earth moving contractor who has occasion to operate various types of powered loader machines.

It is to be understood that the present invention is not limited to the embodiments described above, but encompasses any and all embodiments within the scope of the following claims.

I claim:

1. An excavation attachment for a powered loader having a load bucket attachment structure and a load bucket lifting and tilting mechanism, the excavation attachment comprising:

an adapter backing plate having a working face and a loader attachment face opposite said working face;

a plurality of attachment fittings disposed upon the attachment face of said backing plate adapted for attaching said backing plate to the load bucket attachment structure of the loader;

laterally spaced first and second fulcrum arms extending from the working face of said backing plate;

a fulcrum laterally disposed between said fulcrum arms, for selectively placing upon an underlying surface; and at least one lever tine extending from said fulcrum and generally opposite said backing plate, for levering an object from the underlying surface by rotating said fulcrum upon the underlying surface by the load bucket tilting mechanism of the loader.

2. The excavation attachment according to claim 1, further including:

first and second grappling tine axle lugs, extending respectively from said first and second fulcrum arms;

a laterally disposed grappling tine axle pivotally secured through said first and second grappling tine axle lugs;

at least one grappling tine affixed to and extending from said grappling tine axle, generally opposite said at least one lever tine; and at least one grappling tine actuator communicating with said grappling tine axle, for selectively pivoting said grappling tine axle and said at least one grappling tine extending therefrom, for selectively grasping an object between said at least one lever tine and said at least one grappling tine.

3. The excavation attachment according to claim 2, wherein said at least one grappling tine comprises a plurality of laterally symmetrically disposed grappling tines.

4. The excavation attachment according to claim 1, wherein said at least one lever tine comprises a plurality of laterally symmetrically disposed lever tines.

5. The excavation attachment according to claim 1, wherein said fulcrum comprises a cylinder having a laterally disposed axial center extending between said first and second fulcrum arms.

6. The excavation attachment according to claim 1, with the load bucket attachment structure of the loader including an upper edge and lower attachment pins, wherein said plurality of attachment fittings of the attachment face of said backing plate comprise:

said backing plate having an upper edge and a lower edge opposite the upper edge;

an attachment plate pocket formed along the upper edge of said backing plate adapted for removable installation over the upper edge of the load bucket attachment structure of the loader; and a plurality of pin receptacles formed adjacent the lower edge of said backing plate, for removably accepting the lower attachment pins of the load bucket attachment structure of the loader.

7. The excavation attachment according to claim 1, with the load bucket attachment structure of the loader having at least one tilt actuator and at least one pivot attachment pin, wherein said plurality of attachment fittings of the attachment face of said backing plate comprise:

said backing plate having an upper edge and a lower edge opposite the upper edge;

at least one tilt actuator attachment disposed adjacent the upper edge of said backing plate adapted for removable installation to the at least one tilt actuator of the load bucket attachment structure of the loader; and at least one laterally disposed pivot attachment pin receptacle disposed adjacent the lower edge of said backing plate adapted for removably accepting the at least one pivot attachment pin of the load bucket attachment structure of the loader.

8. An excavation attachment for a powered loader having a load bucket attachment structure and a load bucket lifting and tilting mechanism, the excavation attachment, comprising:

an adapter backing plate having a working face and a loader attachment face opposite said working face;

a plurality of attachment fittings disposed upon the attachment face of said backing plate adapted for removably attaching said backing plate to the removable load bucket attachment structure of the loader;

laterally spaced first and second fulcrum arms extending from the working face of said backing plate;

a fulcrum laterally disposed between said fulcrum arms, for selectively placing upon an underlying surface;

at least one lever tine permanently and immovably affixed to and extending from said fulcrum and generally opposite said backing plate, for levering an object from the underlying surface by rotating said fulcrum upon the underlying surface by the load bucket tilting mechanism of the loader;

first and second grappling tine axle lugs, extending respectively from said first and second fulcrum arms;

a laterally disposed grappling tine axle pivotally secured through said first and second grappling tine axle lugs;

at least one grappling tine affixed to and extending from said grappling tine axle, generally opposite said at least one lever tine; and at least one grappling tine actuator communicating with said grappling tine axle, for selectively pivoting said grappling tine axle and said at least one grappling tine extending therefrom, for selectively grasping an object between said at least one lever tine and said at least one grappling tine.

9. The excavation attachment according to claim 8, wherein said at least one grappling tine comprises a plurality of laterally symmetrically disposed grappling tines.

10. The excavation attachment according to claim 8, wherein said at least one lever tine comprises a plurality of laterally symmetrically disposed lever tines.

11. The excavation attachment according to claim 8, wherein said fulcrum comprises a cylinder having a laterally disposed axial center extending between said first and second fulcrum arms.

12. The excavation attachment according to claim 8, with the load bucket attachment structure of the loader including an upper edge and lower attachment pins, wherein said plurality of attachment fittings of the attachment face of said backing plate comprise:

said backing plate having an upper edge and a lower edge opposite said upper edge;

an attachment plate pocket formed along the upper edge of said backing plate adapted for removable installation over the upper edge of the load bucket attachment structure of the loader; and a plurality of pin receptacles formed adjacent the lower edge of said backing plate adapted for removably accepting the lower attachment pins of the load bucket attachment structure of the loader.

13. The excavation attachment according to claim 8, with the load bucket attachment structure of the loader having at least one tilt actuator and at least one pivot attachment pin, wherein said plurality of attachment fittings of the attachment face of said backing plate comprise:

said backing plate having an upper edge and a lower edge opposite said upper edge;

at least one tilt actuator attachment disposed adjacent the upper edge of said backing plate adapted for removable installation to the at least one tilt actuator of the load bucket attachment structure of the loader; and at least one laterally disposed pivot attachment pin receptacle disposed adjacent the lower edge of said backing plate adapted for removably accepting the at least one pivot attachment pin of the load bucket attachment structure of the loader.

14. An excavation attachment in combination with a powered loader, comprising:

a powered loader having means for removably attaching a load bucket thereto and having means for lifting and tilting a load bucket;

an excavation attachment having:

an adapter backing plate with a working face and a loader attachment face opposite said working face;

a plurality of attachment fittings disposed upon the attachment face of said backing plate, for removably attaching to said removable load bucket attachment means of said loader;

laterally spaced, first and second fulcrum arms permanently and immovably affixed to and extending from the working face of said backing plate;

a fulcrum permanently and immovably affixed to and laterally disposed between said fulcrum arms, for selectively placing upon an underlying surface; and at least one lever tine permanently and immovably affixed to and extending from said fulcrum and generally opposite said backing plate, for levering an object from the underlying surface by rotating said fulcrum upon the underlying surface by said load bucket tilting means of said loader.

15. The excavation attachment according to claim 14, further including:

first and second grappling tine axle lugs, extending respectively from said first and second fulcrum arms of said excavation attachment;

a laterally disposed grappling tine axle pivotally secured through said first and second grappling tine axle lugs;

at least one grappling tine affixed to and extending from said grappling tine axle, generally opposite said at least one lever tine; and at least one grappling tine actuator communicating with said grappling tine axle, for selectively pivoting said grappling tine axle and said at least one grappling tine extending therefrom, for selectively grasping an object between said at least one lever tine and said at least one grappling tine of said excavation attachment.

16. The excavation attachment according to claim 15, wherein said at least one grappling tine of said excavation attachment comprises a plurality of laterally symmetrically disposed grappling tines.

17. The excavation attachment according to claim 14, wherein said at least one lever tine of said excavation attachment comprises a plurality of laterally symmetrically disposed lever tines.

18. The excavation attachment according to claim 14, wherein said fulcrum of said excavation attachment comprises a cylinder having a laterally disposed axial center extending between said first and second fulcrum arms.

19. The excavation attachment according to claim 14, with said load bucket attachment means of said loader including an upper edge and lower attachment pins, wherein said plurality of attachment fittings of said attachment face of said backing plate of said excavation attachment comprise:

said backing plate having an upper edge and a lower edge opposite said upper edge;

an attachment plate pocket formed along the upper edge of said backing plate, for removable installation over the upper edge of said load bucket attachment means of said powered loader; and a plurality of pin receptacles formed adjacent the lower edge of said backing plate, for removably accepting said lower attachment pins of said load bucket attachment means of said powered loader.

20. The excavation attachment according to claim 14, with said load bucket attachment means of said powered loader having at least one tilt actuator and at least one pivot attachment pin, wherein said plurality of attachment fittings of the attachment face of said backing plate of said excavation attachment comprise:

said backing plate having an upper edge and a lower edge opposite said upper edge;

at least one tilt actuator attachment disposed adjacent the upper edge of said backing plate, for removable installation to said at least one tilt actuator of said load bucket attachment means of said powered loader; and at least one laterally disposed pivot attachment pin receptacle disposed adjacent the lower edge of said backing plate, for removably accepting said at least one pivot attachment pin of said load bucket attachment means of said powered loader.

\* \* \* \* \*